United States Patent
Viikari et al.

(10) Patent No.: US 9,476,975 B2
(45) Date of Patent: Oct. 25, 2016

(54) NON-LINEAR RESONATING SENSOR AND A METHOD

(75) Inventors: Ville Viikari, Espoo (FI); Heikki Seppä, Espoo (FI); Tomi Mattila, Espoo (FI); Ari Alastalo, Espoo (FI); Mark Allen, Espoo (FI); Timo Varpula, Espoo (FI)

(73) Assignee: Teknologian Tutkimuskeskus VTT (FI)

( * ) Notice: Subject to any disclaimer, the term of this patent is extended or adjusted under 35 U.S.C. 154(b) by 778 days.

(21) Appl. No.: 13/433,315

(22) Filed: Mar. 29, 2012

(65) Prior Publication Data
US 2012/0235847 A1  Sep. 20, 2012

Related U.S. Application Data

(63) Continuation-in-part of application No. PCT/FI2011/050263, filed on Mar. 29, 2011.

(30) Foreign Application Priority Data

Mar. 31, 2010  (FI) .................................... 20105330

(51) Int. Cl.
*G01S 13/74* (2006.01)
*G01S 13/75* (2006.01)
*G06K 19/067* (2006.01)

(52) U.S. Cl.
CPC ........... *G01S 13/75* (2013.01); *G06K 19/0672* (2013.01)

(58) Field of Classification Search
CPC .................................. H04B 1/59; G01S 13/75
USPC ........................................................ 342/42
See application file for complete search history.

(56) References Cited

U.S. PATENT DOCUMENTS

| | | | | |
|---|---|---|---|---|
| 3,886,549 A | * | 5/1975 | Cheal | G01S 13/56 340/554 |
| 4,063,229 A | * | 12/1977 | Welsh et al. | 340/571 |
| 5,106,175 A | * | 4/1992 | Davis et al. | 385/100 |
| 5,202,692 A | * | 4/1993 | Huguenin et al. | 342/179 |
| 2003/0071300 A1 | * | 4/2003 | Yashima et al. | 257/310 |
| 2005/0206472 A1 | * | 9/2005 | Park | 333/32 |

(Continued)

FOREIGN PATENT DOCUMENTS

| | | |
|---|---|---|
| EP | 2028872 | 2/2009 |
| EP | 2098979 | 9/2009 |

(Continued)

OTHER PUBLICATIONS

Preliminary Examinination Report, PCT/FI2011/050263, Mar. 8, 2012.*

(Continued)

*Primary Examiner* — Frank J McGue

(57) ABSTRACT

Described herein is a passive wireless resonating non-linear sensor that is typically based on a ferroelectric varactor. The sensor replies its data at an intermodulation frequency when a reader device illuminates it at two closely-located frequencies. Furthermore, described herein is a general intermodulation read-out principle for passive wireless sensors. A sensor utilizes a mixing element, such as a varactor and it can be equipped with a capacitive, inductive, or resistive sensor element. When the sensor is illuminated with signals with two frequencies it replies the sensor data at an intermodulation frequency.

11 Claims, 11 Drawing Sheets

(56) References Cited

U.S. PATENT DOCUMENTS

2006/0044178 A1* 3/2006 Miller et al. ............... 342/42
2007/0046397 A1* 3/2007 Bajaj et al. ................ 333/186
2010/0056098 A1 3/2010 Kanno et al.

FOREIGN PATENT DOCUMENTS

| KR | 20080072424 | 8/2008 |
|----|-------------|--------|
| SE | 532089 | 10/2009 |
| WO | WO2011/121180 | 10/2011 |

OTHER PUBLICATIONS

Viikari et al; Technical Solutions for Automotive Intermodulation Radar for Detecting Vulnerable Road Users; 2009 IEEE 69th Vehicular Technology Conference. Barcelona, Spain, Apr. 26-29, 2009, pp. 1-3.

Viikari et al; RFID MEMS Sensor Concept Based on Inter Modulation Distortion; IEEE Sensors Journal; Dec. 2009; pp. 1918-1922, vol. 9, No. 12.

* cited by examiner

NON-LINEAR RESONATING SENSOR AND A METHOD

The present application is a non-provisional application of provisional application 61/468,588 filed Mar. 29, 2011 which is herein incorporated by reference in its entirety.

BACKGROUND OF THE INVENTION

Wireless sensors have a great deal of potential in numerous applications where a wired readout is difficult, for example, due to harsh operating conditions, rotating parts or cost and complexity of wiring. Wireless sensors are passive, battery-assisted semi-passive, or active. The advantages of passive sensors are that their life-time or operation conditions are not limited by the battery and that they are inexpensive. Examples of passive wireless sensors are silicon-based radio frequency identification (RFID) tags, surface acoustic wave (SAW) RFID, and inductively-coupled resonance-circuit sensors.

The RFID tags are based on integrated circuits (ICs), which enable several sophisticated features such as rewritable memory and anti-collision protocols. The cost of an RFID tag is low due to their high manufacturing volumes. RFID is mostly used for identification but can also be used to realize other sensors by adding a sensing element to the tag. Passive RFID have some disadvantages. The power rectifier that generates the required power for the IC limits the largest read-out distance and the highest operation frequency.

The highest operation frequency and read-out distance of RFID are limited by the rectified power for the IC and are a few GHz and 5-10 m, respectively. An additional sensor element further increases power consumption. Therefore, RFID does not suit well for applications where a long distance or a high operation frequency is required. High operation frequencies are needed to enable small tag sizes and accurate spatial localization of the tag.

SAW tags transform the electromagnetic energy to SAWs propagating on a piezoelectric substrate. The SAWs are then manipulated and transformed back to electromagnetic waves. The SAW tags lend themselves well as sensors as the propagation properties of SAWs can be tailored to be sensitive to several measured quantities, such as temperature or strain, and no external sensor element is necessarily needed, although it is possible to use one. The highest operation frequency is typically limited to a few GHz by the line width of acoustical reflectors fabricated on the substrate. In addition, a piezoelectric material as a sensing element may limit their applications.

Inductively-coupled resonance-circuit sensors are utilized, for example, to measure strain and moisture. These sensors consist, comprise, or comprise substantially of a simple electrical resonance circuit, whose resonance frequency is sensitive to the measured quantity. The simple sensor structure enables a low manufacturing cost. However, these sensors can not be read across large distances as they require near-field coupling to the reader device.

Mixer sensors contain mixing elements such as diodes and transmit the sensor data either at a harmonic or intermodulation frequency when illuminated by a reader device. Although microwave illumination is usually used, an optical excitation signal can also be used for improved spatial localization.

Harmonic radar and tags were first proposed for traffic applications and were used for tracking insects and avalanche victims. The intermodulation principle was first proposed for telemetry and later was used to implement wireless ferroelectric temperature sensor and was modified for wireless MEMS sensors based on mechanical mixing. The advantage of the intermodulation principle over the harmonic scheme is a smaller frequency offset which facilitates circuit design and compliance with frequency regulations. Generally, harmonic and intermodulation sensors can use a very high frequency and be operated at a large distance.

Passive wireless sensors can also be implemented with the MEMS technology. The MEMS sensor, when illuminated with two different frequencies, replies the sensor data at an intermodulation frequency. The intermodulation interrogation concept is somewhat similar to the harmonic radar.

Intermodulation sensors utilize mixing elements (a ferroelectric varactor and MEMS resonator) as sensing elements and do not facilitate a sensing element in a straightforward way. In addition, proximity of dielectric or conductive material distorts the read-out of the ferroelectric intermodulation sensor.

Identification RFID tags are limited to small frequencies and relatively short read out distances and are not well-suited for harsh environments (high temperature etc.).

SAW-solutions suit only for certain measurement quantities (temperature, strain) and are limited to frequencies below a few GHz. Typically they are also rather expensive (made on piezo-electric substrates).

Interrogation of resonance sensors requires a near-field coupling and these sensors are therefore limited to very short read-out distances. These sensors also require more complex read-out technique as the coupling between the sensor and the read-out unit affects the sensor.

SUMMARY OF THE INVENTION

It is an aspect of the present invention to provide a reflector element adapted to operate in the area of electromagnetic radiation.

It is an aspect of certain embodiments of the present invention for the reflector element to include an antenna for sending the reflected energy to desired target. Furthermore, the antenna may additionally comprise a non-linear element electrically coupled to the antenna and/or a sensor for measuring some parameter.

Furthermore, it is an aspect of certain embodiments of the present invention to provide a non-linear sensor interrogated using the intermodulation mixing principle.

It is an aspect of certain embodiments of the present invention that the non-linear sensor comprises a ferroelectric varactor. A sensor according to such embodiments offers a simple architecture similar to the inductively-coupled resonance-circuit sensors, but with at least the possibility of a significantly larger interrogation distance.

Certain embodiments of the present invention present a passive wireless sensor based on a ferroelectric varactor or other non-linear element. The sensor replies its data at the intermodulation frequency when the reader device illuminates it at two closely located frequencies. The sensor concept can be used to realize different low-cost sensors that can be read out across large distances.

Furthermore, certain embodiments of sensors according to the present invention consist, or are comprised, of an antenna directly matched to a ferroelectric varactor or other non-linear element. The sensor is illuminated by two closely located frequencies and it reflects an intermodulation frequency produced in the non-linear element.

A sensor according to certain embodiments of the present invention has an impedance that is sensitive to the measured quantity, such as temperature. The resonance frequency and the quality factor of the sensor are determined based on the intermodulation response. The resonance frequency and the quality factor are related to the impedance that is sensitive to the measured quantity.

A sensor in accordance with embodiments of the present invention is well suited for applications where a wired readout is difficult, for example, due to harsh operating conditions, rotating parts or the cost and complexity of wiring. A potential application for sensors according to the present invention is within the field of temperature measurements in industrial machinery and engines. A ferroelectric varactor can be cost-effectively realized using thin-film manufacturing technologies and can be a solid-state device, which both can be advantageous, for example when compared to MEMS-based non-linear elements. Low-cost mass production of the entire sensor using the printed electronics manufacturing methods can also be achieved.

Furthermore, a sensor according to certain embodiments of the present invention can be exploited in applications where low-cost passive sensors are required, e.g., measuring moisture, strain or temperature in building structures. Also, such sensor solutions are well-suited for applications in harsh operating environments. Low-cost fabrication techniques, including but not limited to printed electronics methods, can be beneficial in enabling commercial viability.

According to further embodiments of the present invention, there is an intermodulation radar disclosed herein for determining the presence of metal corrosion in reinforcing steel members in concrete structures and for automotive radars to detect pedestrians, cyclists and other road users who are in high risk of serious injury in a traffic accident.

An aspect of certain embodiments of the present invention is to provide for a passive wireless sensor employing an intermodulation read-out principle. A read-out principle is tolerant of an electrical environment of an antenna. Furthermore, it can facilitate a generic capacitive, inductive, or resistive sensor element, such as a MEMS sensor. Potential applications of such sensors can include wireless monitoring of car tire pressure, moisture inside building structures, and strain in bridges. Ultimately, the concept can enable very small implantable health and fitness sensors.

In the following, the invention is examined with the aid of examples of embodiments according to the accompanying figures.

DETAILED DESCRIPTION OF EXEMPLARY EMBODIMENTS

Figure 1:
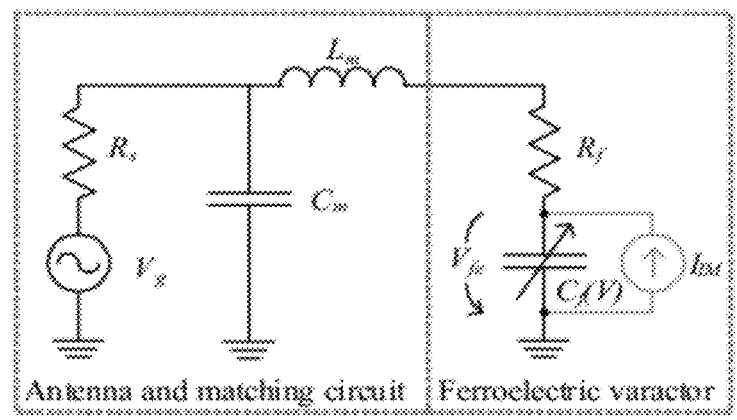
FIG. 1 shows an electrical equivalent circuit of the sensor in accordance with an embodiment of the invention based on a ferroelectric varactor.

Operation Principle of a Sensor According to an Embodiment of the Present Invention The sensor consists, or comprises of a ferroelectric varactor that is conjugate matched to an antenna. The equivalent electrical circuit of the sensor is shown in FIG. 1. The antenna is represented as an equivalent voltage source with the voltage $V_g$ and the internal resistance $R_s$. The matching circuit consists, comprises, or comprises substantially of the shunt capacitance $C_m$ and the series inductance $L_m$ and may either be included into the antenna or it may be realized as a separate circuit. The resistance $R_f$ represents the losses of the varactor and $C_f(V)$ relates the non-linear capacitance to the voltage. The current source in parallel with the non-linear capacitance is used to represent the modulated current over the varactor in the following analysis.

The presented sensor can be realized using any non-linear element but the following analysis considers a Barium Strontium Titanate varactor $Ba_xSr_{1-x}TiO_3$ (BST) in paraelectric mode. This varactor has a symmetric C-V curve at zero bias and lends itself well to produce intermodulation mixing products.

Intermodulation Response of the Sensor According to the Embodiment of the Present Invention In what follows, an equation relating the actuation signals at two frequencies to the sensor response at an intermodulation frequency is derived. The same low actuation power level is assumed for the both input frequencies.

The sensor antenna is represented as an equivalent voltage source, as shown in FIG. 1, producing a voltage $$V_g = 2\sqrt{2P_{in}R_s}(\cos\omega_1 t + \cos\omega_2 t), \quad (1)$$

where $P_{in}$ is the received power at one frequency, $R_s$ is the equivalent resistance of the antenna, and $\omega_1$ and $\omega_2$ are the angular frequencies of the actuation signals. The voltage over the varactor is approximately $$V_{fe} \approx \frac{2\sqrt{2P_{in}R_s}(\cos\omega_1 t + \cos\omega_2 t)}{j\omega C_{max}(R_s + (Z_f + j\omega L_m)(1 + j\omega C_m R_s))} = \hat{V}_{fe}(\cos\omega_1 t + \cos\omega_2 t), \quad (2)$$

where $Z_f = R_f + 1/(j\omega C_{max})$ is the impedance of the ferroelectric varactor, $R_f$ is the voltage-independent series resistance of the varactor and $C_{max}$ is the zero-voltage capacitance of the varactor. For simplicity, it is assumed that the electrical bandwidth of the system is much larger than the frequency difference between $\omega_1$ and $\omega_2$, i.e., $\omega \approx \omega_1 \approx \omega_2$.

The voltage dependence of a BST paraelectric varactor can be expressed as $$C_f(V) = \frac{C_{max}}{2\cosh\left[\frac{2}{3}\sinh^{-1}\left(\frac{2V}{V_{1/2}}\right)\right] - 1}, \quad (3)$$

where $C_{max}$ is the maximum capacitance and $V_{1/2}$ is the voltage at which the capacitance is halved. The capacitance can be approximated at small voltages with the second order Taylor's expansion as $$C_f(V) \approx C_{max}\left(1 - \frac{16}{9}\frac{V^2}{V_{1/2}^2}\right). \quad (4)$$

The modulated current over the varactor is approximately $$I_f = j\omega C_f(V_{fe})V_{fe} \approx j\omega C_{max}V_{fe}\left(1 - \frac{16}{9}\frac{V_{fe}^2}{V_{1/2}^2}\right). \quad (5)$$

Substituting (2) into (5) gives the current component at an intermodulation frequency $$I_{fe,IM} = -\frac{4}{3}\left(\frac{2\sqrt{2P_{in}R_s}}{(R_s + (Z_f + j\omega L_m)(1 + j\omega C_m R_s))}\right)^3 \cos((2\omega_1 - \omega_2)t). \quad (6)$$

This current is produced by the equivalent current source in parallel with the varactor, as shown in FIG. 1. The radiated power (equivalently the power dissipated in $R_s$) at an intermodulation frequency is $$P_{IM} = \left(\frac{16\sqrt{2} R_s^2 P_{in}}{3V_{1/2}^2 \omega^3 C_{max}^3 |R_s + (Z_f + j\omega L_m)(1 + j\omega C_m R_s)|^4}\right)^2 P_{in}. \quad (7)$$

Exploitation as a Sensor

The presented concept allows the wireless measurement of two sensor parameters: the resonance frequency ($f_r$) and the quality factor (Q). The wireless sensor can be implemented by designing the sensor such that either $f_r$ or Q or both are sensitive to the measured quantity, such as temperature, strain, or humidity. The presented ferroelectric device can be used as a temperature sensor. The capacitance of the ferroelectric varactor is typically a strong function of the temperature.

The effective impedance of an ideal paraelectric varactor is power independent at small power levels that were assumed above in the derivation of the intermodulation response of the varactor. When interrogating a sensor, the small signal assumption can be validated for example by comparing the sensor responses measured at different power levels.

Experiments and Simulations

Measurement Setup

Figure 2:
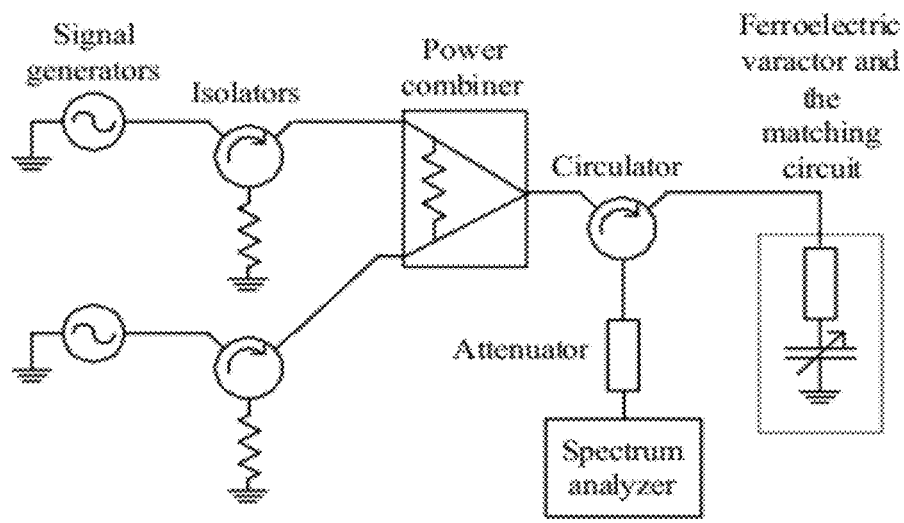
FIG. 2 shows a measurement setup for measuring the intermodulation conversion efficiency and the temperature of the ferroelectric device.
Figure 3:
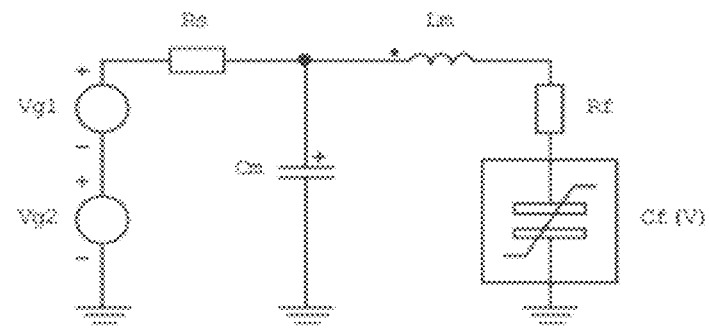
FIG. 3 shows schematically a circuit for simulating the intermodulation response of the ferroelectric varactor in APLAC. Earlier, similar models in APLAC have been effectively used to model the complex nonlinear Duffing effect and intermodulation behavior in, for example, the microelectromechanical devices.

The wired measurement setup that is used to measure the intermodulation frequency response of the sensor is shown in FIG. 2. The two input tones are generated with signal generators (Agilent E8257D and Agilent E8257C) and fed through isolators, power combiner and circulator to the tested device. The reflected signal is separated with the circulator and fed to a spectrum analyzer (Rohde & Schwarz FSEM) that is used to measure the power at the intermodulation frequency. An attenuator is applied in front of the spectrum analyzer in order to suppress the third order mixing in the analyzers mixer. The varactor is shorted at DC using a bias-T to avoid its possible self-biasing.

In the temperature sensor demonstration, the ferroelectric device is cooled down in a cryogenic probing station (Nagase & Co. LTD, BCT-21MRFZ). For reference, the temperature dependence of the varactors zero-voltage capacitance is measured with the impedance analyzer.

In addition to the wired measurement, the intermodulation response of the sensor is measured wirelessly. The circulator is connected to a broadband horn antenna (BBHA 9120 A, Schwazbeck—Mess Elektronik, Germany) and the ferroelectric sensor is connected to a half-wavelength dipole antenna with a coaxial cable. The half-wavelength antenna is placed outside the cryogenic probing station such that the distance between the antennas is 0.4 m.

Simulations

The intermodulation response of the ferroelectric sensor was simulated with the Aplac[1] software (AWR, El Segundo, Calif., USA) using the harmonic balance simulation including harmonic frequencies up to third order. The circuit schematic of the ferroelectric sensor is shown in FIG. 2. The voltage dependent capacitance of the ferroelectric varactor is modeled with the dynamic voltage-controlled current source whose charge as a function of the voltage is given as $$Q(V) = \frac{3C_{max}V_{1/2}}{2}\sinh\left(\frac{1}{3}\sinh^{-1}\left(\frac{2V}{V_{1/2}}\right)\right). \tag{8}$$

The charge-voltage dependence given in (8) is the voltage-integral of (3) and is equivalent to the C-V—curve given in (3).

Measured and Simulated Ferroelectric Sensor

The ferroelectric sensor consists, comprises or comprises substantially of a ferroelectric varactor matched to 50 Ohm at 1.35 GHz with a series inductor and a shunt capacitor as shown in FIG. 1. The measured zero-voltage capacitance of the varactor at 290 K is $C_{max}$=1.2 pF with the series resistance of $R_f$=3.7Ω. The voltage, at which the capacitance is halved was measured with an impedance analyzer (4294A, Agilent Technologies) at 110 MHz at different excitation voltages from 10 to 500 mV and was found to be $V_{1/2}$=7.5 V independent of the applied excitation. The nominal values of the matching inductor and capacitors are 13 nH (±5%) (LQW04AN13NJ00, Murata Manufacturing Co.) and 10.3 pF, respectively. Inductance value of 12.7 nH was used in the simulations and calculations and it was found to provide the best fit. The inductance value providing the best fit is well within the tolerance limits given by the manufacturer. The parameters of the ferroelectric sensor that are used in the simulations and calculations are summarized in Table I.

TABLE I

THE PARAMETERS OF THE FERROELECTRIC SENSOR USED IN THE SIMULATIONS AND CALCULATIONS.

| | |
|---|---|
| Zero-voltage capacitance | $C_{max}$ = 1.2 pF |
| Series resistance of the varactor | $R_f$ = 3.7 Ω |
| Voltage at which the capacitance is halved | $V_{1/2}$ = 7.5 V |
| Matching series inductance[1] | $L_m$ = 12.7 nH |
| Matching shunt capacitance | $C_m$ = 10.3 pF |

Fitted to the measurements.

Frequency Response of the Sensor

Figure 4:
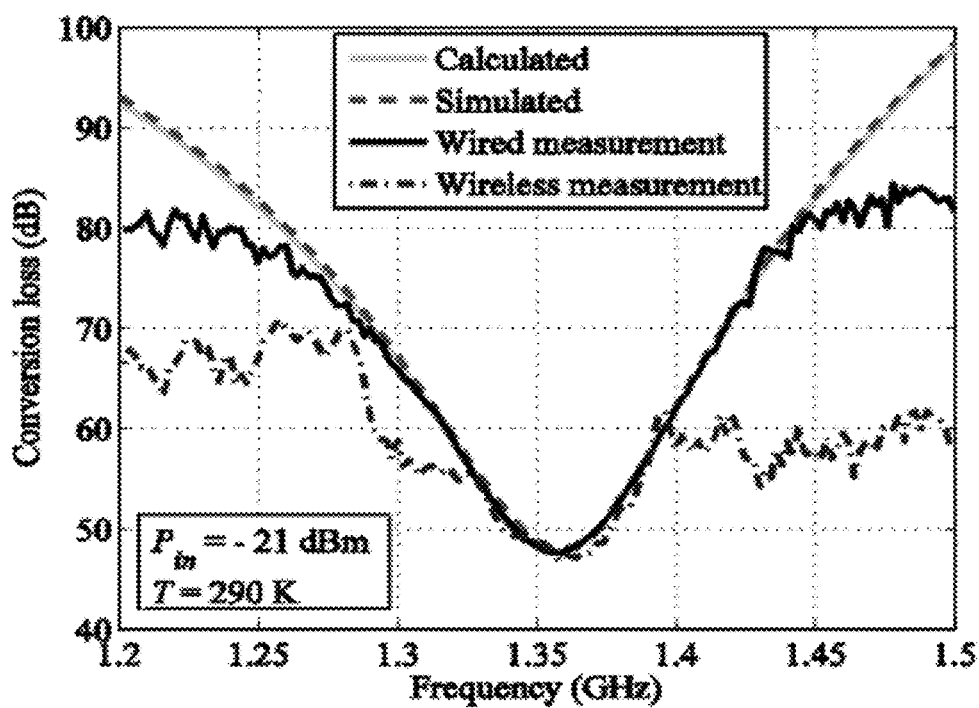
FIG. 4 shows graphically calculated, simulated and measured conversion loss of the sensor in accordance with the invention as a function of the frequency. The absolute power level in the wirelessly measured curve may not be precise.

FIG. 4 shows the calculated, simulated and measured intermodulation conversion losses ($P_{in}/P_{IM}$) of the sensor as a function of the frequency. The frequency offset between the signals is 100 kHz and the signal strength is −21 dBm. The sensor is at 290 K temperature. The absolute power level in the wireless measurement is not accurate as the measurement was not performed in an anechoic chamber and antennas were not fully characterized.

The calculated, simulated and measured conversion losses agree well. The minor deviations in the wirelessly measured curve are likely due to slight mismatch of the sensor antenna. Note that the low signal-to-noise-ratio in the wireless measurement prevents to measure high conversion loss values.

Temperature Response of the Sensor

Figure 5:
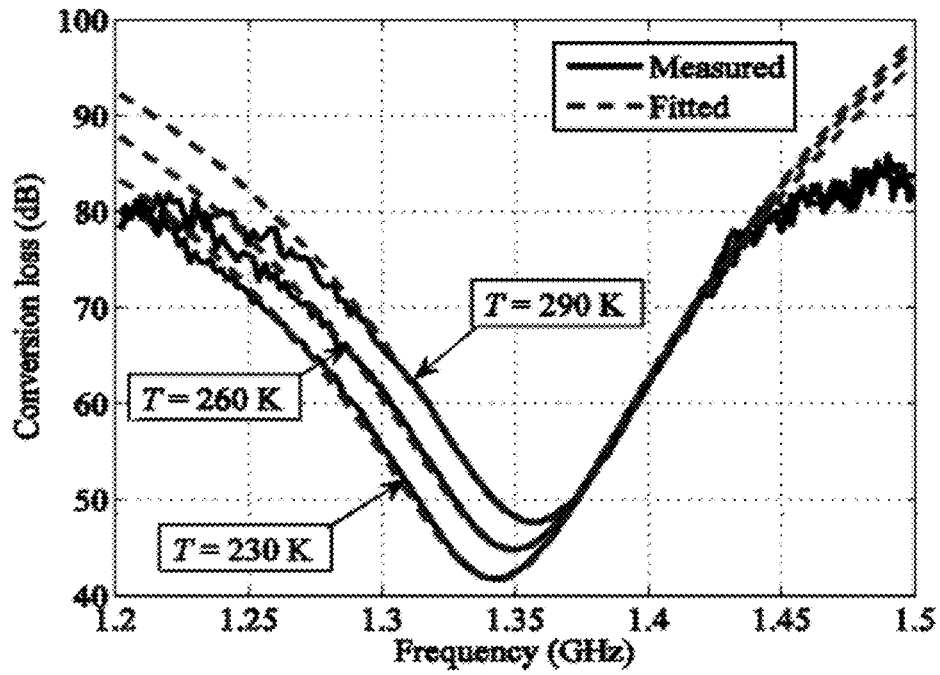
FIG. 5 shows graphically measured and fitted conversion losses of the sensor in accordance with the invention as a function of the frequency. Different curves are for different temperatures.

The temperature affects both $V_{1/2}$ and $C_{max}$ of the ferroelectric varactor. According to (7), $V_{1/2}$ has constant effect to the conversion loss at all frequencies, whereas $C_{max}$ affects also the matching frequency. The prototype device is used as a temperature sensor by measuring the frequency response of the conversion loss and finding $C_{max}$ that provides the best fit between the theoretical and measured responses defined as $$\min_{A,C_{max}} \{(AL_{meas}(f) - L_{calc}(f, C_{max}))^2\}, \tag{9}$$

where $L_{meas}$ is the measured frequency response of the conversion loss, $L_{calc}$ is the calculated frequency response of the conversion loss and A is the signal attenuation. FIG. 5 shows the measured conversion loss of the sensor at 290, 260, and 230 K temperatures with the fitted curves.

Figure 6:
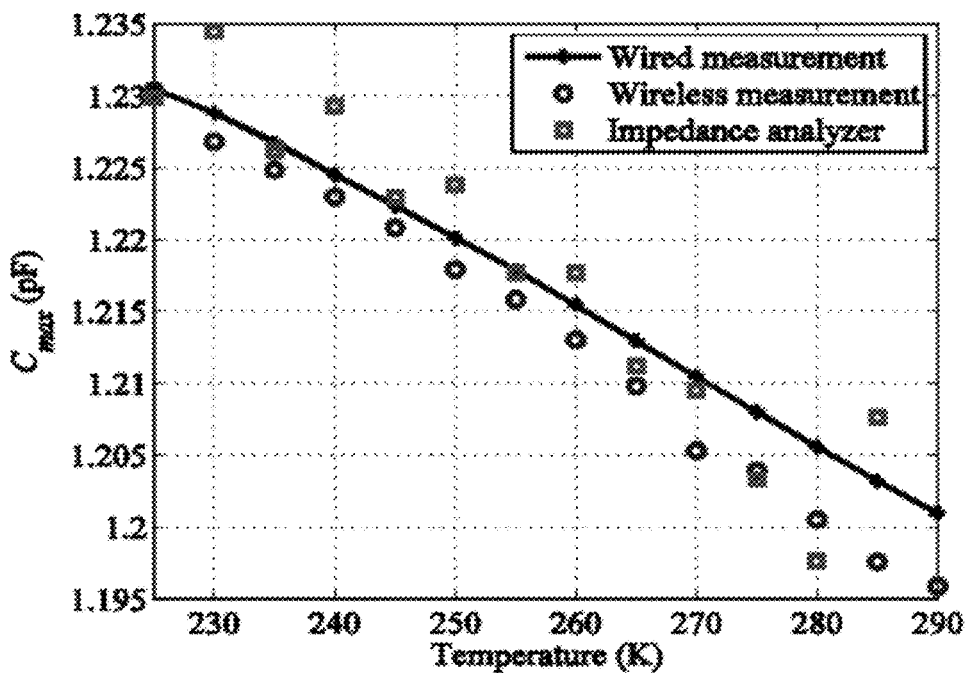
FIG. 6 shows graphically measured temperature responses of the sensor in accordance with an embodiment of the invention.

The measured temperature response of the varactors zero-voltage capacitance $C_{max}$ is shown in FIG. 6. The temperature response is measured both using wired and wireless setups using the intermodulation principle. Also shown is the varactor capacitance directly measured using the impedance analyzer.

According to the measurement performed with wired connection, $C_{max}$ changes linearly with the temperature. The results of the wireless measurement exhibits slight deviation from those of wired measurements. The deviations are due to lower signal-to-noise ratio and slight mismatch of the sensor antenna impedance, which is not taken into account in the fitting process. The capacitance value of the varactor is small for the impedance analyzer for precise measurement and therefore the results obtained with the analyzer exhibit relatively large variations. However, the overall trend obtained with the impedance analyzer corresponds well to that measured with the intermodulation principle. Note that the temperature resolution of the sensor could be increased by using ferroelectric material whose permittivity is more sensitive to the temperature.

Power Response of the Sensor

Figure 7:
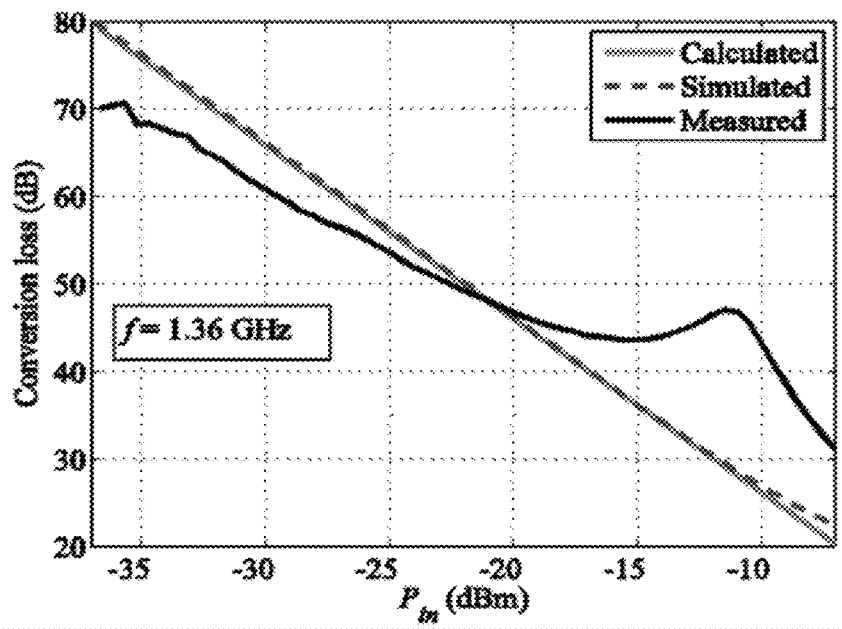
FIG. 7 shows the measured, calculated and simulated conversion loss of the sensor in accordance with an embodiment of the present invention at 1.36 GHz as a function of the input power level.

The measured, simulated and calculated conversion losses of the sensor as a function of the input power are shown in FIG. 7.

The slope of the measured conversion loss slightly differs from the calculated and simulated ideal response. The deviation is likely to be due to the power dependency of the impedance of the ferroelectric varactor. The simulated conversion loss verifies that the effect is not due to the change of the effective capacitance of the varactor, which takes place at much higher power levels (∼−5 dBm, seen as the small deviation of the simulated response from the calculated one in the lower right corner). Instead, the varactor used is not perfectly ideal and its impedance depends on the applied voltage. This could be due, for example, the varactor not being ideally paraelectric but also having parasitic ferroelectric (switchable, spontaneous polarization) properties.

The effect of the input power to the measurement accuracy of the sensor was further quantified by measuring the intermodulation frequency response of the sensor at T=290 K at different power levels and finding $C_{max}$ and $R_f$ giving the best fit between the measurements and calculations. The fitted values at different input power levels are shown in FIG. 8.

Figure 8:
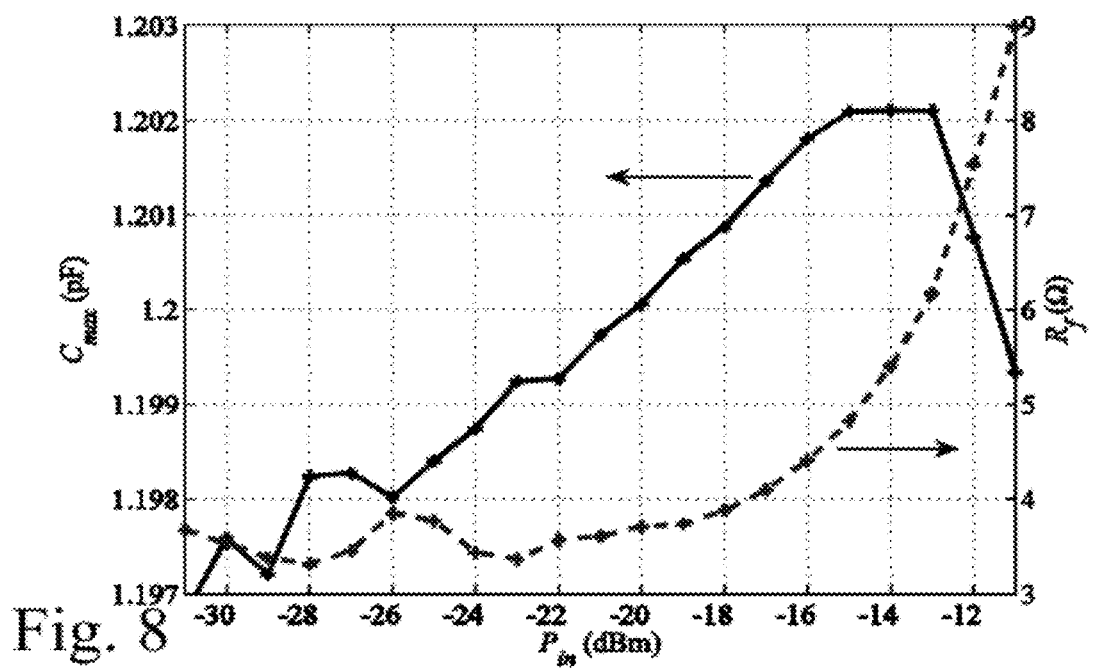
FIG. 8 shows graphically fitted parameters of the ferroelectric varactor at different power levels of the sensor in accordance with an embodiment of the invention.

According to the fit in FIG. 8 both the resistance $R_f$ and the capacitance $C_{max}$ of the ferroelectric varactor show a minor power dependency. The capacitance change in the used input power range from −31 to −11 dBm is 5 fF (∼0.4% relative change) which corresponds to approximately ±5 K uncertainty in the temperature measurement presented in FIG. 5. We emphasize that the power dependency is due to the unoptimized prototype character of the applied ferroelectric varactors and can be improved by further varactor development. The power dependency can also be mitigated, e.g, by performing the measurements at different power levels.

Detection Distance of the Sensor

The detection distance of the sensor depends heavily on the intermodulation conversion efficiency of the sensor $P_{IM}/P_{in}$ given in (7). The highest conversion efficiency of the experimental sensor is limited by the input power at which the equivalent impedance of the ferroelectric varactor becomes power dependent. In the present case, the corresponding input power is approximately −20 dBm and the conversion loss 47 dB.

Assuming a 20 dBm transmit power, a 10 dBi reader antenna gain, a 3 dB sensor antenna gain, and a receiver sensitivity of −110 dBm, the detection distance of the prototype sensor is 8 m at 1.35 GHz. The power received by the sensor at 8 m would be −20 dBm, at which the measured intermodulation conversion loss is 50 dB. The corresponding link budget calculation is presented in Table II.

TABLE II

THE CALCULATED LINK BUDGET OF THE FERROELECTRIC SENSOR INTERROGATED WITH A READER DEVICE.

| | |
|---|---|
| Transmitted power | $P_t$ = 20 dBm |
| Reader antenna gain | $G_{reader}$ = 10 dBi |
| Free space loss | $\left(\frac{\lambda}{4\pi r}\right)^2 = -53$ dB |
| Sensor antenna gain | $G_{sensor}$ = 3 dBi |
| Received power by the sensor | $P_{sensor}$ = −20 dBm |
| Intermodulation mixing loss | L = 47 dB |
| Sensor antenna gain | $G_{sensor}$ = 3 dBi |
| Free space loss | $\left(\frac{\lambda}{4\pi r}\right)^2 = -53$ dB |
| Reader antenna gain | $G_{reader}$ = 10 dBi |
| Received power at intermodulation frequency | $P_r$ = −107 dBm |

The detection distance of the sensor depends heavily on the intermodulation conversion efficiency of the sensor $P_{IM}/P_{in}$ given in (7). In principle, the conversion efficiency can be made very high by decreasing $V_{1/2}$ or by increasing the electrical quality factor of the sensor resonance. For example, the Barium proportion of a BST varactor affects its $V_{1/2}$. The electrical quality factor of a ferroelectric varactor depends on the conductor and dielectric losses and range from 10 to several hundreds for thin-film varactors at GHz frequencies. Consequently, the detection distance of the sensor could be even tens of meters at a few GHz frequencies.

Figure 9:
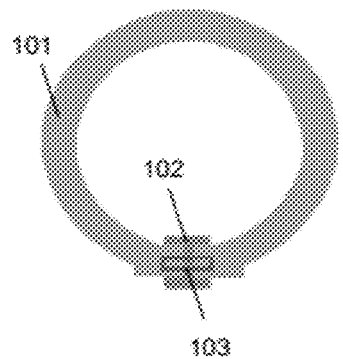
FIG. 9 shows as a top view of a sensor element in accordance with an embodiment of the invention.
Figure 10:
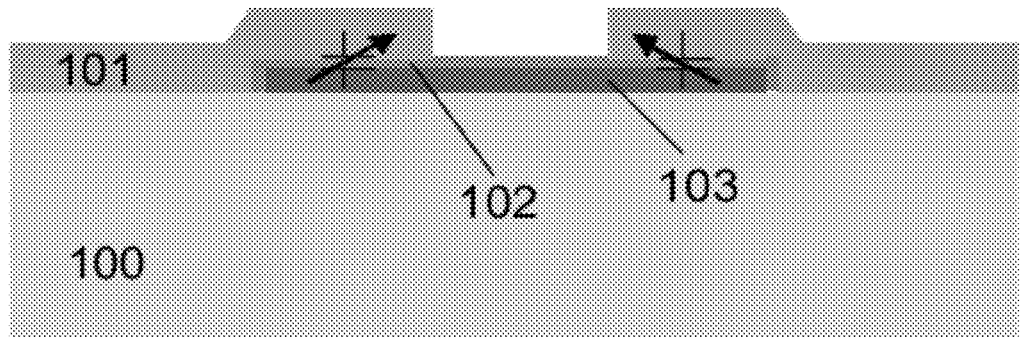
FIG. 10 shows as a cross sectioned side view of the sensor of FIG. 9.

As an example, in accordance with FIGS. 9 and 10, a schematic layout of a low-cost sensor realization is shown. FIG. 9 shows the top-view of the sensor structure which consists, comprises or comprises substantially of (1) a conductor 101, arranged in a suitable antenna shape (such as a loop-antenna in FIG. 9),
(2) a non-linear insulator layer 102 such as a ferroelectric material, and
(3) a second conductor (bottom electrode).

The structure is built on a substrate 100 as shown in the cross-sectional view in FIG. 10. As further shown in FIG. 10, the conductor layers 101 and 103 are arranged so that they suitably overlap to form a capacitor structure together with the layer 102 acting as the nonlinear insulator. The sensor structure can thus be described essentially as a loop antenna containing a gap bridged by a nonlinear capacitor. The capacitor is responsible for the inducing the nonlinear response (intermodulation products). The loop (inductive part) and the capacitor are matched for the desired resonance to occur.

The structure can be fabricated using several possible methods. These methods include (i) the conventional rigid-substrate-based (wafer) methods, including in particular the methods for ferroelectric layer growth and deposition of sufficiently thick conductors for low-losses (see Riekkinen et al., WO2008034940),
(ii) the printed electronics manufacturing methods for very-low cost sensor fabrication,
(iii) thermal spraying methods for cost-effective manufacturing of the sensor structures on challenging substrates and for difficult sensing conditions (such as on machinery parts).

One embodiment of the invention is a directional reflector based on nonlinear backscattering. This kind of element can be used for reflecting a car radar RF-beam such that visibility of objects marked by the reflector in accordance with the invention can be improved in the radar picture. The improvement in visibility is based on the mechanism's, which can be used separately or together:

i) the reflected signal is shifted in frequency and/or
ii) the reflected signal is directed to the origin of the radar signal.

The shift in frequency is based on nonlinear element like ferroelectric or paraelectric element like capacitor, micromechanical resonator or a combination of these elements. The directivity is based on cat's-eye mirror (kuutionurkka) or phased antenna group.

The reflector is advantageously passive and produced by printing technologies but the reflector may also be active, whereby battery powered amplifiers are used for amplifying the reflected signal. The reflectors may be used in clothes for example for detection of pedestrians or alternatively in the bumpers of cars for improving detection of approaching vehicles or cars driving in the same direction.

Forward looking radars get all the time more popular in passenger cars. These radars are used e.g., for measuring distance to the next car. This measurement may aid for example cruise control devices. The radar may be used for example to detect other objects like animals and pedestrians. Pedestrians scatter the radar beam into all directions whereby the RF-power returning to the radar as well as the range of the radar will be smaller than in case of a directed reflection. Further, for example detection of a child standing in front of a rigid object is difficult from a radar picture because the reflection from the child is mixed with the reflection from the rigid object. If the radar could detect a standing child it would also be able to react to the situation where the child suddenly runs into the driveway. One possible solution would be to mark the sides of the driveway with reflectors visible to the radar. Then, the car aided with the radar could anticipate a sharp turn and warn the driver about too high speed. Advantageously the sides of the driveway would be marked by reflectors embedded to the sides of the driveway. These reflectors could be detected also through snow and ice. The visibility of the object may be improved by marking the objects by reflectors, which reflect directly to the original direction of the sent signal and shift the reflected signal to a different frequency that the original sending frequency or alternatively actively amplify the reflection signal. Active transponders of airplanes are one example of these kinds of systems. The same principle is used also in antitheft alarm systems used in security ports of shops. In these cases the sold product includes a non linear element, which creates harmonic multiples of the detection signal sent by the detection port. The systems using harmonics are well known also in radar solutions and they are used for detecting victims of avalanches and detection of insects.

In traffic solutions it is important that the reflectors are low cost units because they are used in large amounts for marking the roads, pedestrians, traffic signs etc. Therefore the most advantageous solutions of the invention are non-linear reflective RF-elements produced by printing technologies. The adaptation of the car radars compatible to these elements may be implemented easily by software.

Metal structure functions as a simple reflector for radio waves. Then the metallic structure like planar wafer has to be dimensioned such that it is essentially larger than the used wavelength.

70 GHz radar signal has wavelength of 4 mm in air. The thickness of the metal structure has to be multiple of the depth of penetration of the radar signal, which is in this frequency about 0.1-0.5 μm. A reflector in accordance with the invention may be produced by printing Cabot silver ink as a part of a cloth. This print may be embedded to the cloth such that it is invisible to the eye.

This kind of a reflector reflects the signal back at the same frequency and to the direction defined by the basic reflection law, where the angle of incidence is the same as angle of departure. Here, if the planar reflector is not perpendicular to the radar beam, an essential portion of the signal power is lost. Furthermore the same frequency disturbance signals weaken the detection.

In accordance with the invention the directivity may be solved by two different ways:

i) using so called cube structure, which is well known from radar reflectors. This kind of a reflector is three dimensional and due to high need of space does not suit for integration with cloths. However, this technology is suitable for car bumpers reflectors. Then the detectability of cars will be improved especially in curved roads. The directivity may be improved also by using known planar phased antenna group. In this case the size of the antenna is around half wavelength of the signal and directivity may be obtained already with two antennas. This planar small structure may be embedded into cloths.

Figure 11:
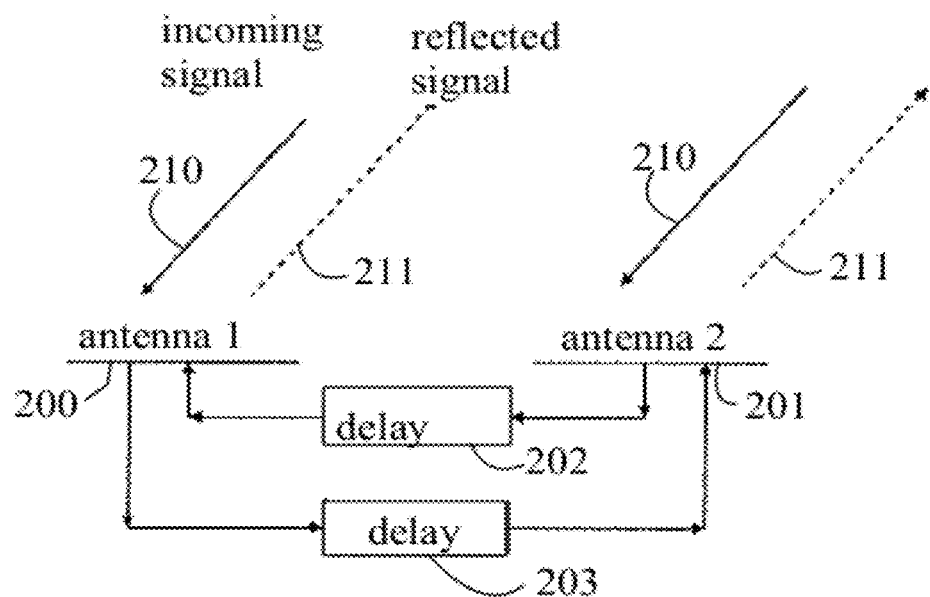
FIG. 11 shows as a block diagram of an embodiment of a directional reflector in accordance with the invention.

FIG. 11 shows the function of the invention in connection with two antennas 200 and 201. In this case the delay lines 202 and 203 are equal and they are impedance matched to the antennas. If it is wished that the reflection has to be distinguished from disturbance reflections by a long delay (several milliseconds) like in SAW RFID detectors, the delay elements 202 and 203 will be will be implemented for example as acoustic BAW or SAW delay lines. SAW RFID detectors use multiple delays and delayed signals are coupled back to the same antenna by which the original excitation signal was received. The system in accordance with the invention using multiple antennas 200 and 201 may be advantageous also in SAW RFID solutions for improving the detection distance. In frequencies of car radars BAW-delay line is easier to implement, because the line width of finger transformer of SAW delay lines becomes very small. If directivity is the only object, the delay length may be much shorter. Then electric delay line is also a possibility.

The frequency shift in accordance with the invention may be implemented by coupling a non-linear element like diode or ferroelectric capacitor to the antenna. This causes to the signal harmonic multiples, intermodulation components and widens the spectrum. The detection of the harmonic components may require hardware modifications to the receiver. On the other hand intermodulation components and widening of the spectrum may be detected by software amendments only. The advantages of using intermodulation components and widening of the spectrum is that the operation may happen in the bandwidth reserved for the radar. If the harmonic components are used, a permission for this might be needed from the authorities and this might be an obstacle for using this technology.

If the reflector is active and it includes a battery, the reflected signal may be amplified.

The printing technology enables economical production whereby the targets may be marked extensively.

This description above has presented a principle for a novel passive wireless sensor based typically on a ferroelectric varactor. The sensor is interrogated by illuminating it at two closely located frequencies and recording the backscattered signal at the intermodulation frequency. The application has further derived an equation for the intermodulation response of the sensor for low actuation power level. The analytical equation is verified by simulations and experiments. A passive wireless temperature sensor based on a ferroelectric varactor is demonstrated at 1.35 GHz.

In accordance with an embodiment of the invention the illumination frequencies $\omega_1$ and $\omega_2$ directed to the object are scanned such that the difference $(\omega_1-\omega_2)$ of the illumination frequencies stays essentially constant.

Figure 13:
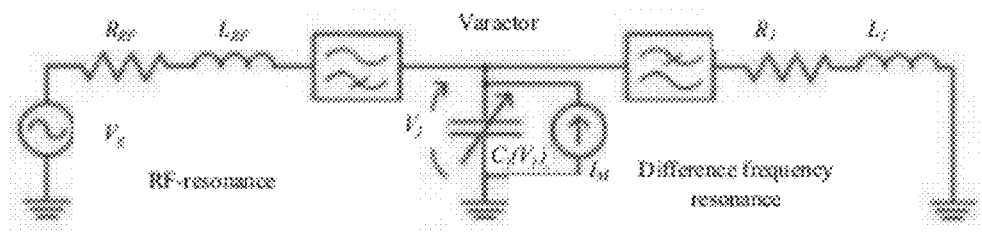
FIG. 13 shows a simplified equivalent circuit of a sensor according to an embodiment of the present invention.

Operation Principle of a Sensor According to an Embodiment of the Present Invention The sensor consists, or comprises of an antenna (represented as a voltage source) matched to a mixing element, which is a varactor diode in this experiment, and a low-frequency resonance circuit containing a capacitive, inductive, or resistive sensing element, as shown in FIG. 13. In the following analysis, we consider a matching circuit consisting, comprising or comprising substantially of a shunt admittance in parallel with the antenna and a series inductance between the antenna and the varactor although other matching topologies can be used as well.

The sensor is actuated with two signals at different frequencies. The signals are mixed in the varactor diode, which, among other frequencies, generates current at a difference frequency. The current at the difference frequency then generates a voltage that depends on circuit impedance. The voltage at the difference frequency further mixes with the original input frequencies, generating intermodulation signals. The low-frequency resonance circuit contains a sensor element that affects the impedance, and thus the voltage at the difference frequency. The sensor data is read out by recording the intermodulation response of the sensor.

In the following analysis, we derive a small-signal intermodulation response for the sensor. The derived response can be used to equate measured intermodulation responses to the sensor values and to predict the read-out range of the sensor.

Intermodulation Response of the Sensor

Figure 12:
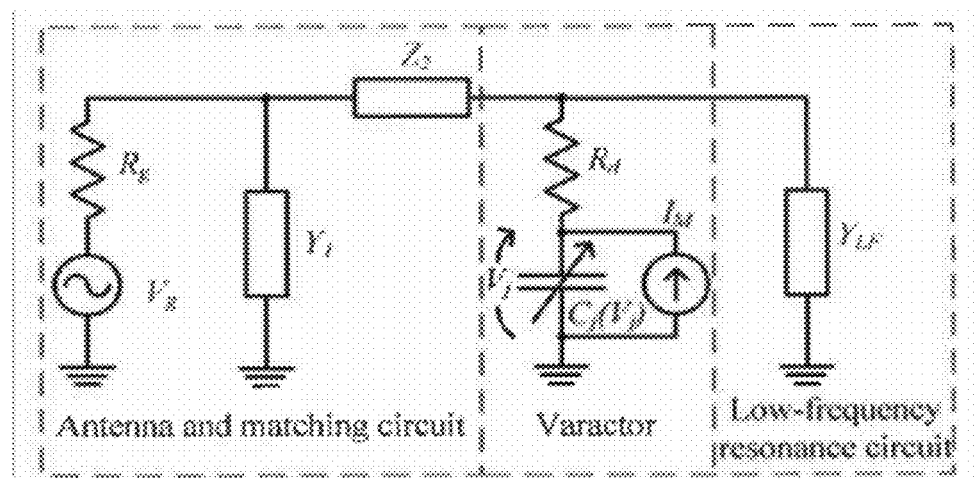
FIG. 12 shows the electrical equivalent circuit of the sensor consisting of an antenna (equivalent voltage generator), matching circuit, varactor diode and low-frequency resonance circuit.

The antenna receives two frequencies and it produces a voltage of $$V_g = 2\sqrt{2P_{in}R_g}\,(\sin\omega_1 t + \sin\omega_2 t) \qquad (10)$$
$$= \hat{V}_g(\sin\omega_1 t + \sin\omega_2 t),$$

where $P_{in}$ is a received power at one frequency, $R_g$ is an antenna resistance, and $\omega_1$ and $\omega_2$ are angular frequencies of the sinusoids. Considering the circuit in FIG. 12, the voltage transfer function from the antenna (generator) to the junction capacitance is $$S_{jg} = \frac{V_j}{V_g} = \frac{Y_d}{j\omega C_{j0}[Z_2(Y_d + Y_{LF}) + 1 + R_g[Z_2 Y_1(Y_d + Y_{LF}) + Y_1 + Y_d + Y_{LF}]]}, \quad (11)$$

where $Y_d = 1/(R_d + 1/(j\omega C_{jo}))$ is a small-signal admittance of the diode, $R_d$ is a series resistance of the diode, and $C_{jo}$ is a junction capacitance at a zero bias. Let us consider an unbiased Schottky varactor diode. The junction resistance at a zero bias is typically very large (~mega Ohms) and can be neglected. In addition, we assume no parasitic capacitance or series inductance for simplicity. The voltage-dependent junction capacitance of the varactor is given as $$C_j(V_j) = \frac{C_{j0}}{\left(1 - \frac{V_j}{\Phi}\right)^\gamma}, \quad (12)$$

where $\gamma$ is the profile parameter for the depletion capacitance ($\gamma=0.5$ for a uniformly doped junction) and $\Phi$ is a junction potential. The charge stored in the capacitor is given as $$Q_j(V_j) = \int C_j(V_j) dV_j = \frac{\Phi C_{j0}}{1-\gamma}\left(1 - \frac{V_j}{\Phi}\right)^{-\gamma+1}, \quad (13)$$

where a possible constant charge is omitted. The second order Taylor's approximation for the charge is $$Q_j(V_j) \approx C_{j0}V_j + \frac{\gamma C_{j0}}{2\Phi}V_j^2. \quad (14)$$

The current of an equivalent Norton current source in parallel with the junction capacitance (shown in FIG. 12) is given as $$I_j = \frac{dQ_j(V_j)}{dt} \approx j\omega C_{j0}V_j + j\omega \frac{\gamma C_{j0}}{2\Phi}V_j^2. \quad (15)$$

The first term represents a current of a normal (voltage-independent) capacitor whereas the second term generates mixing products. The modulated current of the equivalent current generator is obtained by substituting (10) and (11) into (15):

$$I_{j,m} \approx j\omega \frac{\gamma C_{j0} \hat{V}_g^2}{2\Phi}(S_{jg}(\omega_1)\sin\omega_1 t + S_{jg}(\omega_2)\sin\omega_2 t)^2. \quad (16)$$

The current at the difference frequency $f_\Delta = f_2 - f_1$ is $$I_j(\omega_\Delta) \approx j\omega_\Delta \frac{\gamma C_{j0} \hat{V}_g^2 S_{jg}(\omega_1) S_{jg}(\omega_2)}{2\Phi} \cos\omega_\Delta t. \quad (17)$$

The junction voltage at the difference frequency is given as $$V_j(\omega_\Delta) = \frac{j\omega_\Delta C_{jo}\gamma \hat{V}_g^2 S_{jg}(\omega_1) S_{jg}(\omega_2) Z_N(\omega_\Delta)}{2\Phi} \cos\omega_\Delta t, \quad (18)$$

where the impedance of the equivalent Norton current source is given as $$Z_N = \frac{1}{j\omega C_{j0} + \cfrac{1}{R_d + \cfrac{1}{Y_{LF} + \cfrac{1}{Z_2 + \cfrac{1}{Y_1 + R_g}}}}}. \quad (19)$$

The voltage at the difference frequency then mixes with the fundamental frequencies $\omega_1$ and $\omega_2$ generating intermodulation frequencies. The junction voltage at the intermodulation frequency $\omega_{IM}=2\omega_1-\omega_2$ is obtained by substituting (10), (18), and (19) into (15):

$$V_j(\omega_{IM}) = \frac{\omega_\Delta \omega_{IM} C_{j0}^2 \gamma^2 \hat{V}_g^3 S_{jg}^2(\omega_1) S_{jg}(\omega_2) Z_N(\omega_\Delta) Z_N(\omega_{IM})}{4\Phi^2} \sin\omega_{IM} t. \quad (20)$$

The voltage transfer from the junction to the antenna is $$S_{gj} = \frac{1}{R_d[Y_1 + 1/R_g + Y_{LF} + Y_{LF}Z_2(Y_1 + 1/R_g)] + Z_2(Y_1 + 1/R_g) + 1}. \quad (21)$$

Let us define the intermodulation response of the sensor as the ratio of the voltages at the intermodulation and fundamental frequencies across the antenna $$S_{IM} = \frac{V_g(\omega_{IM})}{V_g(\omega_1)} \quad (22)$$

$$= \frac{\omega_\Delta \omega_{IM} C_{j0}^2 \gamma^2 \hat{V}_g^2 S_{jg}^2(\omega_1) S_{jg}(\omega_2) S_{gj}(\omega_{IM}) Z_N(\omega_\Delta) Z_N(\omega_{IM})}{4\Phi^2}.$$

Note that we omit the third order term in the Taylor's approximation in (15). The third order term would directly (without resonance at the difference frequency) generate currents at the intermodulation frequency. These currents do not depend on the resonance at the difference frequency and cannot be utilized for the sensor read-out. Eq. (22) neglects these terms although they likely occur in practice.

Equation (22) may be inconvenient due to its complexity. Let us consider the simplified equivalent sensor circuit consisting, comprising or comprising substantially of two series LCR-resonators separated with ideal high- and low-pass filters, as shown in FIG. 13.

Figure 14:
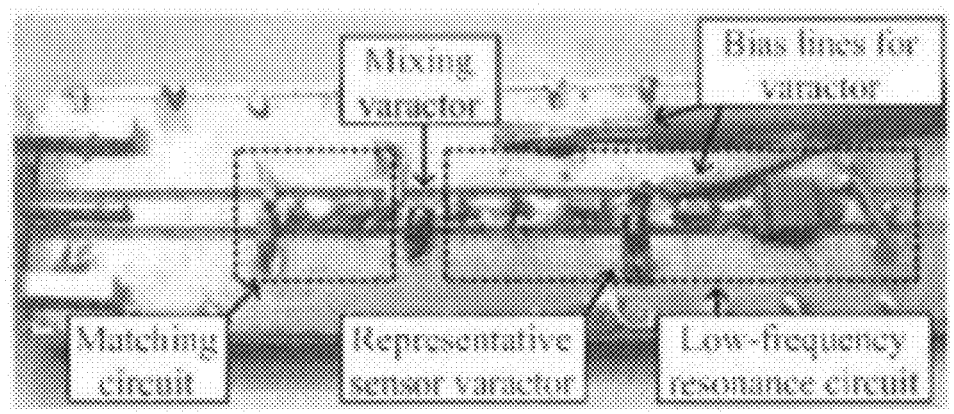
FIG. 14 shows a photograph of a prototype sensor implemented with lumped elements soldered on a grounded 50Ω coplanar waveguide.

Repeating the previous analysis for the sensor of FIG. 13 gives an intermodulation response that is proportional to (under the assumption of $f_\Delta \ll f_{RF}/Q_{RF}$ $$S_{IM} \sim \frac{Q_{RF}^4}{\left[Q_{RF}^2\left(\frac{f_{0,RF}^2 - f_{RF}^2}{f_{0,RF}^2}\right)^2 + \frac{f_{RF}^2}{f_{0,RF}^2}\right]^2} \frac{Q_\Delta}{\sqrt{Q_\Delta^2\left(\frac{f_{0,\Delta}^2 - f_\Delta^2}{f_{0,\Delta}^2}\right)^2 + \frac{f_\Delta^2}{f_{0,\Delta}^2}}}, \quad (23)$$

where $Q_{RF}=1/(2\pi f_{0,RF} R_{RF} C_{j0})$ and $Q_\Delta=1/(2\pi f_{0,\Delta} R_\Delta C_{j0})$ are the quality factors of the two resonators at the carrier resonance frequency $f_{0,RF}=1/(2\pi\sqrt{L_{RF}C_{j0}})$ and the difference resonance frequency $f_{0,\Delta}=1/(2\pi\sqrt{L_\Delta C_{j0}})$. The model of FIG. 14 agrees well with that of FIG. 12 near the resonances. The simplified model also reveals that the intermodulation conversion efficiency is proportional to the fourth power of the quality factor of the RF-resonator (or matching circuit) and directly proportional to the quality factor of the low-frequency resonator.

Experiments and Simulations
Sensor Prototype

The sensor prototype is implemented using lumped capacitors and inductors as matching elements and a varactor diode as a mixing element. The lumped elements are soldered on a grounded 50Ω coplanar waveguide shown in FIG. 14.

We demonstrate a wireless sensor by adding a voltage-controlled varactor in the low-frequency resonance circuit. The voltage-controlled varactor simulates a general capacitive sensing element and its value is controlled with an external DC-voltage source. The representative sensor varactor is identical to the mixer varactor.

Simulation Model

Figure 15:
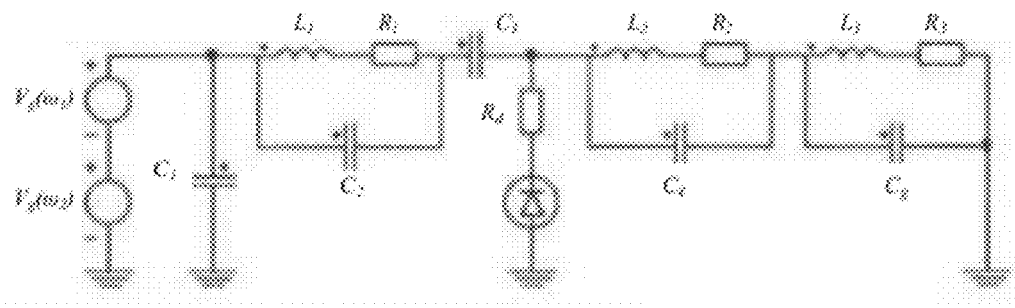
FIG. 15 shows a schematic circuit of a simulation model according to embodiment of the present invention.

The intermodulation response of the sensor is simulated with the Aplac software (AWR, El Segundo, Calif.) using the harmonic balance simulation up to third harmonics. The mixing varactor is simulated using the Aplac diode-model. The schematic circuit of the simulated sensor is shown in FIG. 15. The internal resistance of the voltage source is $R_g=50\Omega$.

The matching admittance in the calculations is $Y_1 = j\omega C_1$, the matching impedance is $$Z_2 = \frac{1}{j\omega C_2 + \frac{1}{R_1 + j\omega L_1}} + \frac{1}{j\omega C_3}, \quad (24)$$

and the low-frequency resonator admittance is $$Y_{LF} = \frac{1}{\frac{1}{j\omega C_4 + \frac{1}{R_2 + j\omega L_2}} + \frac{1}{j\omega C_5 + \frac{1}{R_3 + j\omega L_3}}}. \quad (25)$$

The component values used in the simulations and calculations are summarized in Table III.

TABLE III

Parameters of the sensor used in the simulations and calculations.

| Generator resistance | $R_g$ = 50 Ω |
| Series resistance of $L_1$ | $R_1$ = 0.62 Ω |
| Series resistance of varactor | $R_d$ = 3 Ω |
| Series resistance of $L_2$ | $R_2$ = 8 Ω |
| Series resistance of $L_3$ | $R_3$ = 25 Ω |
| Matching inductor | $L_1$ = 11 nH |
| RF-block inductor | $L_2$ = 44 nH |
| Low-frequency inductor | $L_3$ = 4.7 μH |
| Matching capacitor | $C_1$ = 7.9 pF |
| Parallel capacitance of $L_1$ | $C_2$ = 0.4 pF |
| Junction capacitance at zero bias | $C_{j0}$ = 3 pF |
| Low frequency block capacitor | $C_3$ = 2.2 pF |
| Parallel capacitance of $L_2$ | $C_4$ = 1.5 pF |
| Varactor capacitance at zero-bias | $C_s$ = 4.3 pF |
| Parameter for the depletion capacitance | $\gamma$ = 0.5 |
| Junction potential | $\Phi$ = 0.87 V |
| Saturation current | $I_s$ = 1 nA |
| Quality factor at the carrier frequency | $Q_{RF}$ = 14.9 |
| Quality factor at the difference frequency | $Q_\Delta$ = 24.0 |
| Resonance at the carrier frequency | $f_{RF}$ = 1.19 GHz |
| Resonance at the difference frequency | $f_\Delta$ = 23.76 MHz |

The nominal values of the inductors and matching capacitors are used in the simulations and calculations, but the inductor series resistances ($R_1$, $R_2$, $R_3$) and the parallel capacitances ($C_2$, $C_4$, $C_5$) are found out by fitting the theory to the measurements. The capacitance and series resistance of the mixing varactor are measured with a network analyzer.

The prototype sensor has two 1000 pF DC-block capacitors in series with $C_s$, and both varactors are shunted with 100 kΩ resistors to prevent unintentional charging. The DC-block capacitors and shunt resistors are excluded in the simulation model.

Measurement Setup

Figure 16:
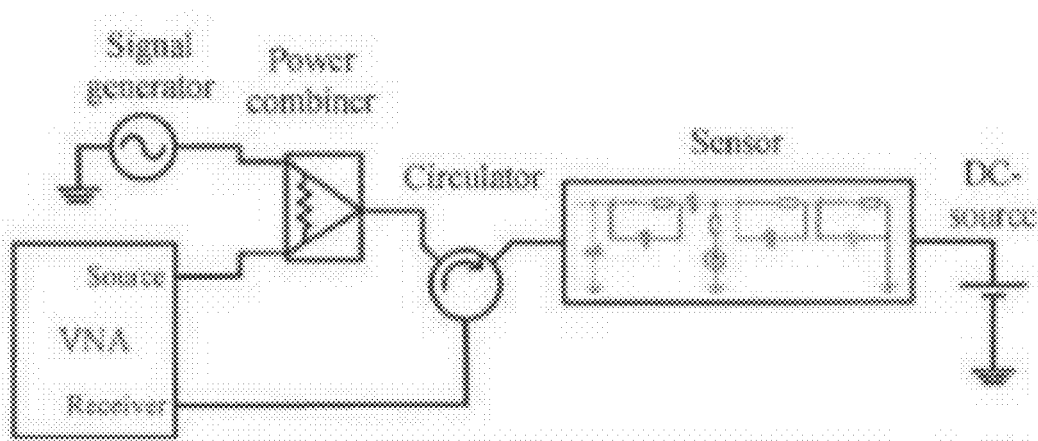
FIG. 16 shows a schematic layout of a wired measurement setup for measuring the intermodulation response of a sensor.

The intermodulation response is measured with a network analyzer (Agilent E8364B) capable for frequency offset measurements. One excitation signal is generated by the network analyzer's source and the other by an external signal generator (Agilent E83650B). The signals are combined with a power combiner (Narda 4321-2) and are fed to the sensor through a circulator (Western Microwave 3JC-I020). The reflected signal from the sensor is distinguished with the circulator and detected by the network analyzer's receiver. A DC-source (Agilent E3646A) is used for biasing the varactor that represents a capacitive sensing element. The wired measurement setup is shown in FIG. 16.

In addition to the cabled measurements, the sensor response is measured wirelessly. In the wireless setup the sensor is equipped with a half-wavelength dipole antenna and the excitation signals from the power combiner are fed to a horn antenna (Dorado GHI-12N). The receiver of the network analyzer is connected to an identical horn and the distance between the horn antennas and the sensor is 1 m.

Results
Intermodulation Response of the Sensor

Figure 17:
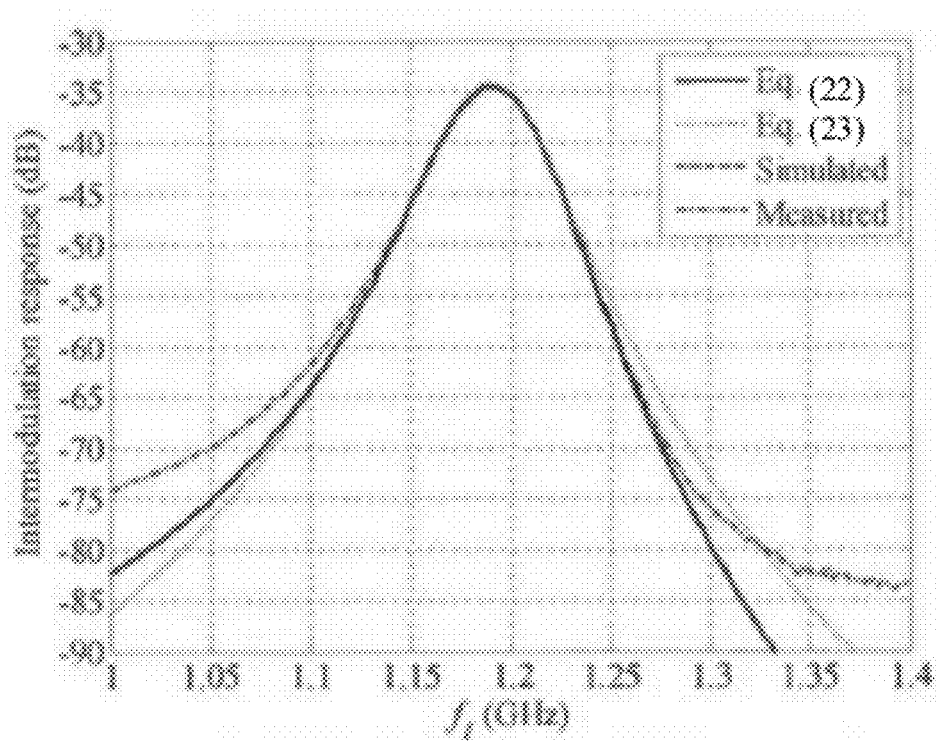
FIG. 17 shows the calculated (Eq. (22): solid dark, Eq. (23): dotted light, simulated (dashed black), and measured (dash-dot grey) intermodulation responses of a sensor according to an embodiment of the present invention as a function of $f_1$. The input power is −15 dBm and the frequency difference is $f_\Delta$=23.75 MHz.

The calculated, simulated, and measured (by cable) intermodulation responses as a function of the input signal frequency $f_1$ are shown in FIG. 17. The difference frequency is kept constant $f_\Delta=23.75$ MHz, the input power is $P_{in}=-15$ dBm, and the bias voltage of the representative sensor capacitance is $V_{DC}=0$ V.

The calculated (Eq. (22)) and simulated intermodulation responses align almost perfectly and agree well with the measured response near the resonance (or impedance match) at 1.2 GHz. The calculated response from (23) also agrees well with that calculated from (22) near the resonance showing that the simple model characterizes well the frequency behavior.

Figure 18:
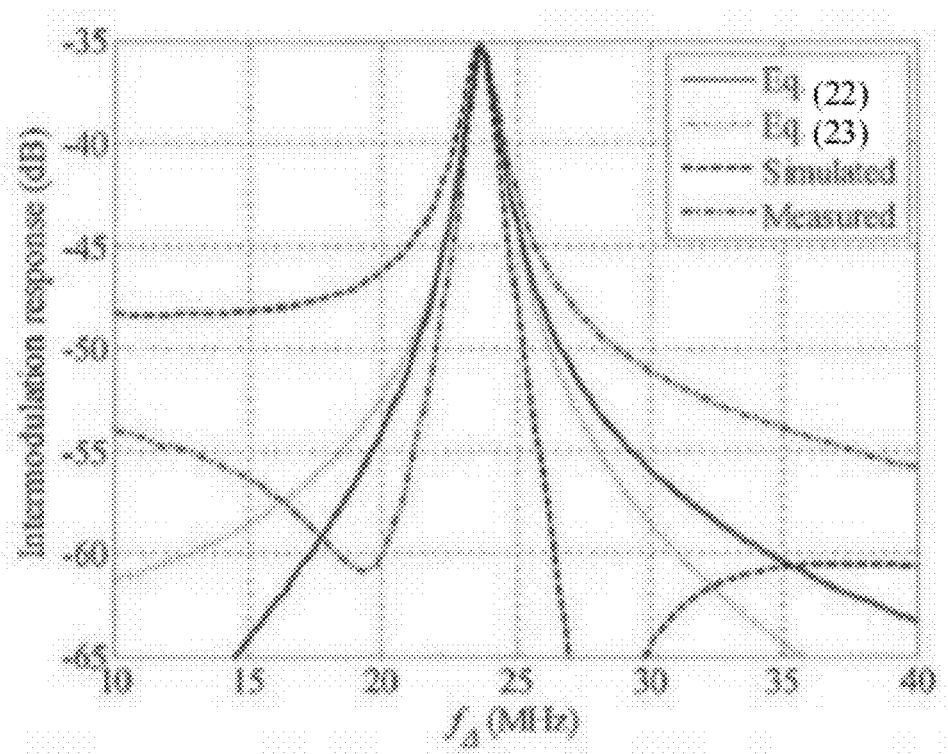
FIG. 18 shows the calculated (Eq. (22): solid black, Eq. (23); dotted grey), simulated (dashed black), and measured (dash-dot grey) intermodulation responses of a sensor according to an embodiment of the present invention as a function of $f_\Delta$. The input power is −15 dBm and the input frequency is $f_1$=1.2 GHz.
Figure 19:
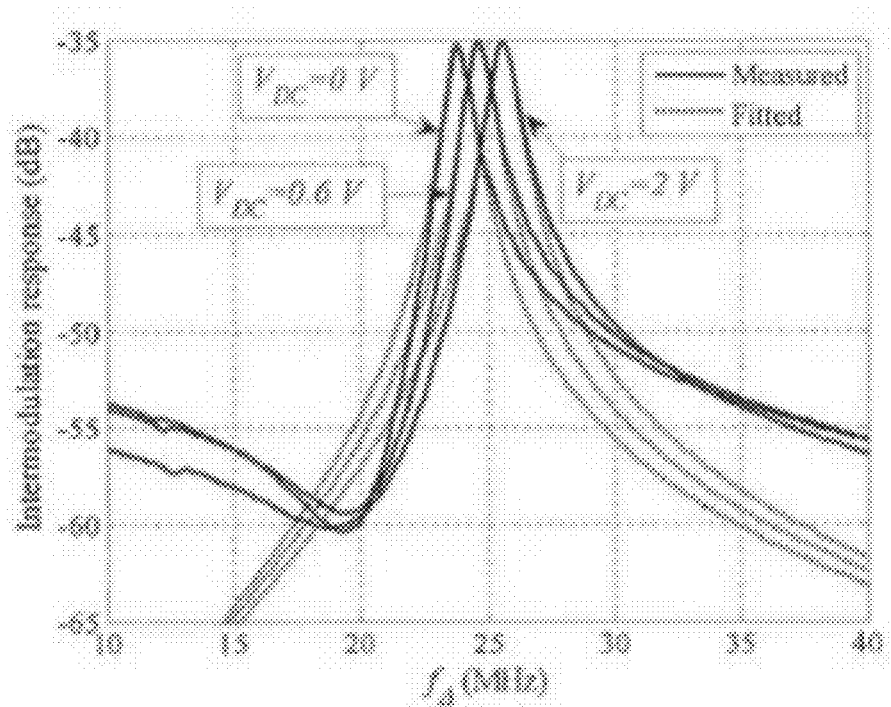
FIG. 19 shows measured intermodulation responses at different bias voltages with fitted analytical responses.
Figure 20:
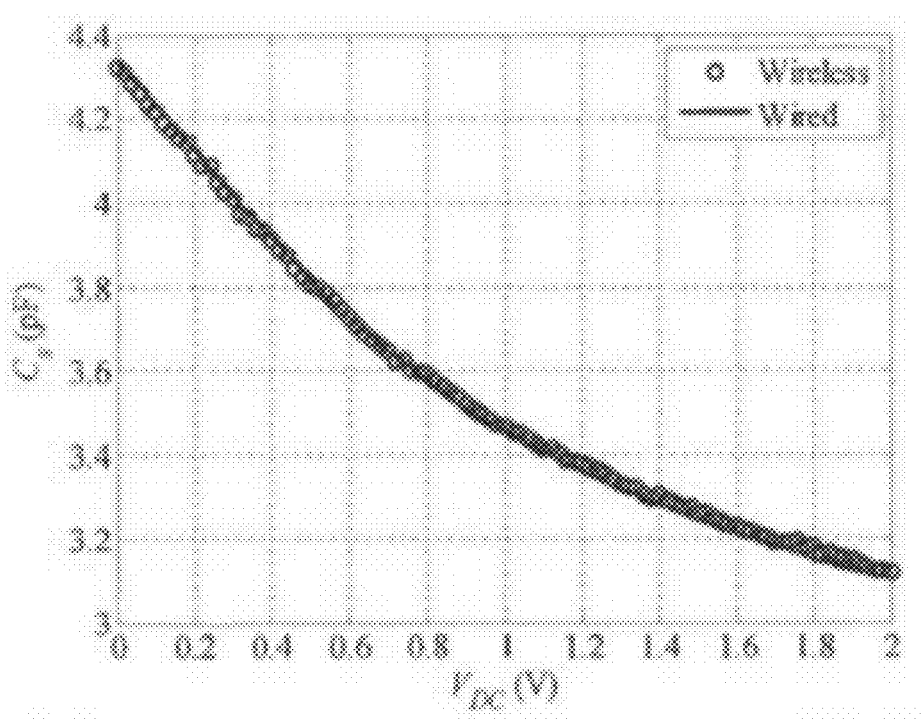
FIG. 20 shows the measured sensor capacitance wirelessly (circles) and by cable (solid black line) as a function of the sensor varactor reverse bias voltage.

The same responses as a function of the difference frequency are shown in FIG. 18. The input frequency is $f_1=1.2$ GHz, the input power is $P_{in}=-15$ dBm, and the bias voltage of the representative sensor capacitance is $V_{DC}=0$ V The measured, calculated, and simulated responses are very similar at $f_\Delta=23.75$ MHz, where $|Z_N|$ and the difference frequency-dependent intermodulation term peak. The difference frequency-independent intermodulation term (discussed in Section II A) dominates outside this resonance and therefore the analytic curves deviate from the measured and simulated curves. Recall that the difference frequency-independent intermodulation term (the third order voltage term in the Taylor approximation of (15)) is neglected in the analysis.

The deviation between the measured and simulated curves is likely due to the phase at which the difference frequency-dependent and -independent intermodulation terms add to each other. According to FIG. 18, these terms seem to add constructively below the resonance and destructively above the resonance in the simulation whereas they sum in the opposite way in the measurements. This is likely due to parasitic elements that are neglected in the simulations. The difference frequency independent term has a constant phase whereas the phase of the difference frequency dependent term follows the impedance phase of the resonant circuit.

Sensor Response

Figure 21:
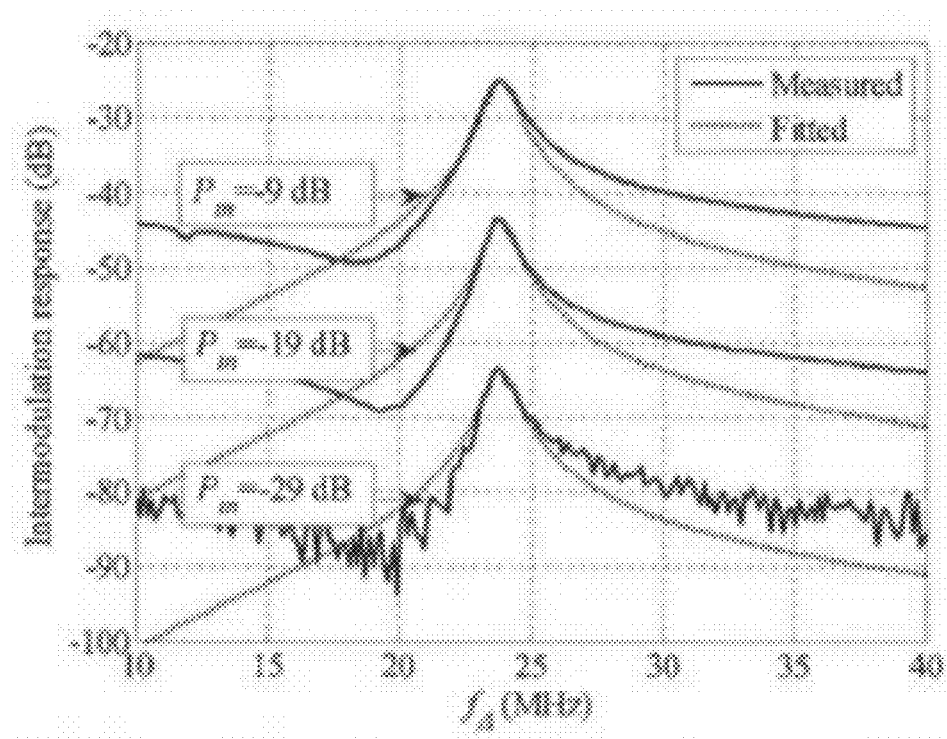
FIG. 21 shows measured intermodulation responses at input power levels of −29 dBm, −19 dBm, and −9 dBm with the fitted analytical responses. The carrier frequency is $f_1$=1.2 GHz and the bias voltage is $V_{DC}$=0 V.

The sensor principle is demonstrated by using a voltage-controlled varactor in the low-frequency resonance circuit representing a generic capacitive sensing element. The intermodulation response of the sensor is recorded at different bias voltages and the analytic model is fitted to the measured responses in order to find out the sensor capacitance values from the measured responses. FIG. 21 shows three measured intermodulation responses at bias voltages of 0 V, 0.6 V, and 2 V with the fitted analytical curves (Eq. (22)). A change in the sensor capacitance $C_s$ shifts the resonance at the difference frequency.

The fitted sensor capacitance values from both wired and wireless measurements as a function of the bias voltage are depicted in FIG. 21. The results from both measurements coincide well to each other with the maximum difference of approximately 20 fF. The results verify that the sensor capacitance can be determined also wirelessly.

Power Dependency of the Sensor Response

Figure 22:
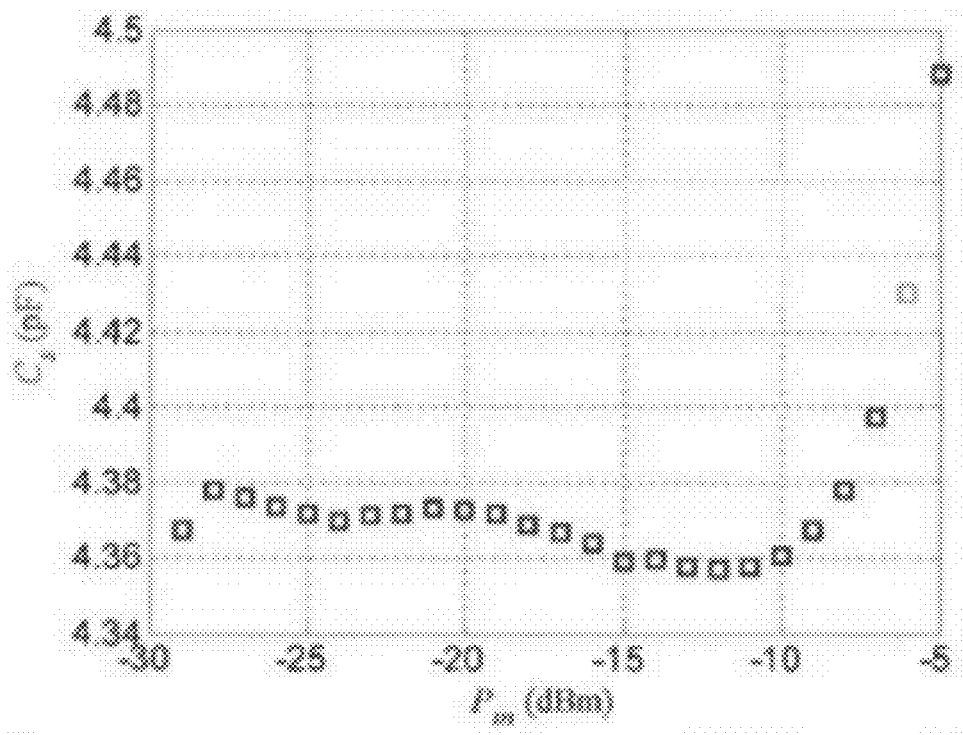
FIG. 22 shows measured sensor capacitance as a function of the input power. The carrier frequency is $f_1$=1.2 GHz and the bias voltage is $V_{DC}$=0 V.

The highest input power of the sensor is limited by the impedance of the mixing varactor that becomes power-dependent at high power. The power dependency of the sensor response is studied by recording the intermodulation response at different power levels and determining the fitted sensor capacitance as a function of the input power. Three measured responses at the input power levels of −29 dBm, −19 dBm, and −9 dBm with fitted analytical responses (Eq. (22)) are shown in FIG. 21. The response shape remains almost unchanged at these power levels. The measured sensor capacitance as a function of the input power is shown in FIG. 22.

Below −8 dBm, the absolute deviation of the measured sensor capacitance due to changing power is 10 fF from its low-power average. As the total sensor capacitance change in this experiment is 1.2 pF, the error due to unknown input power below −8 dBm is only ~0.8%. The measured sensor capacitance depends strongly on the input power above −8 dBm. The power-dependency of the sensor could possibly be reduced using a different mixing element. The power dependency could also be mitigated by measuring the sensor response at different power levels.

The difference between the measured sensor capacitances wirelessly and by a cable is of the same order (~20 fF) as the deviation due to unknown input power (~10 fF). Therefore we assume that the measurement accuracy in this demonstration is not limited by the resolution.

Utilization as a Sensor

The proposed sensor platform can be used to implement a sensor by adding a capacitive, inductive or resistive sensing element to the low-frequency resonance circuit. Examples of capacitive sensors are MEMS microphones, MEMS inertial sensors, MEMS pressure sensors, and ceramic humidity sensors. The piezo-resistive strain gauges are widely used as deformation sensors and an inductive humidity sensor. In addition, the demonstration readily shows how voltages can be measured wirelessly using a varactor. The voltage measurement accuracy in the wireless experiment is approximately 0.02 V and the tested range is 2 V. The piezoelectric strain gauge is an example of sensors producing a voltage output.

The read-out distance in the wireless experiment was 1 m, but the sensor could potentially be read-out across much larger distances. The read-out distance depends strongly on the intermodulation conversion efficiency, which for the demonstrated sensor is approximately −35 dB at −15 dBm input power level. The conversion efficiency is proportional to the squared input power in the small-signal region. The conversion efficiency could be increased using high-Q circuit elements and a mixing varactor with stronger capacitance-voltage non-linearity.

Assuming that the prototype sensor was interrogated with a reader with 20 dBm transmit power, 10 dBi antenna gain and −105 dBm sensitivity, and that the sensor was equipped with an antenna with 3 dBi gain, the detection distance of the sensor would be 9 m at 1.2 GHz. The corresponding link budget calculation is presented in Table IV.

TABLE IV

Calculated link budget for the prototype sensor.

| | |
|---|---|
| Transmitted power | $P_t$ = 20 dBm |
| Reader antenna gain | $G_r$ = 10 dBi |
| Free space loss | $\left(\dfrac{4\pi\gamma}{\lambda}\right)^2 = 53$ dB |
| Sensor antenna gain | $G_s$ = 3 dBi |
| Received power by the sensor | $P_s$ = −20 dBm |
| Intermodulation mixing loss | L = 45 dB |
| Sensor antenna gain | $G_s$ = 3 dBi |
| Free space loss | $\left(\dfrac{4\pi\gamma}{\lambda}\right)^2 = 53$ dB |
| Reader antenna gain | $G_r$ = 10 dBi |
| Received power by the reader | $P_r$ = −105 dBm |

We have presented herein an intermodulation read-out principle for passive wireless sensors. The method enables wireless read-out of a capacitive, inductive, or resistive sensing element. We have derived analytical equations for the intermodulation response of the sensor that can be used to calculate the sensor value from the measured response and to predict the achievable detection range. The analytical equations are verified by simulations and the concept is experimentally demonstrated at 1.2 GHz both wirelessly and by cable. The present application therefore shows that it is feasible to implement passive wireless sensors based on the intermodulation principle.

Further aspects and embodiments of the present invention provide subject matter as defined in the following numbered paragraphs:

Paragraph 1. A reflector element adapted to operate in the area of electromagnetic radiation, including an antenna for sending the reflected energy to desired target, including an non-linear element electrically coupled to the antenna.

Paragraph 2 A reflector element in accordance with paragraph 1, wherein the non-linear element is a ferroelectric varactor.

Paragraph 3. A reflector element in accordance with paragraph 1, wherein the non-linear element is a paraelectric element.

Paragraph 4. A reflector element in accordance with paragraph 1, wherein the non-linear element is a micromechanical resonator.

Paragraph 5. A reflector element, in accordance with any preceding paragraph or their combination, wherein the reflector comprises a directional antenna (202, 202).

Paragraph 6. A reflector element in accordance with a previous paragraph or their combination, wherein the reflector includes a sensor for measuring some parameter.

Paragraph 7. A reflector in accordance with paragraph 5, wherein the sensor has an impedance that is sensitive to the measured quantity, such as temperature Paragraph 8. A method for detecting objects, in which at least one frequency signal is directed to an object (101, 102, 103), signal reflected or backscattered from the object is detected, wherein the object is illuminated at two closely located frequencies, and intermodulation frequency reflected or backscattered from the object is detected.

Paragraph 9. A method for detecting objects, in which at least one frequency signal is directed to an object (101, 102, 103), signal reflected or backscattered from the object (101, 102, 103), is detected, wherein the object (101, 102, 103) is illuminated at two closely located frequencies, and harmonic components reflected or backscattered from the object is detected.

Paragraph 10. A method in accordance with paragraph 8 or 9, wherein the sensor has an impedance that is sensitive to the measured quantity, such as temperature, the resonance frequency and the quality factor of the sensor is determined based on the intermodulation response whereby the resonance frequency and the quality factor are related to the impedance that is sensitive to the measured quantity.

The invention claimed is:

1. A reflector element adapted to operate in an area having electromagnetic radiation, comprising:
    an antenna for sending reflected electromagnetic energy to a target,
    a non-linear element electrically coupled to the antenna, and
    a sensor for measuring sensor data, wherein the sensor is operable to provide the sensor data at an intermodulation frequency that is produced in the non-linear element when the sensor detects signals at two frequencies, and
    wherein the sensor has an impedance that is sensitive to a measured quantity and a resonance frequency and a quality factor of the sensor is determined based on an intermodulation response, whereby the resonance frequency and the quality factor are related to the impedance that is sensitive to the measured quantity.

2. A reflector element in accordance with claim 1, wherein the non-linear element is a ferroelectric varactor.

3. A reflector element in accordance with claim 1, wherein the non-linear element is a paraelectric element.

4. A reflector element in accordance with claim 1, wherein the non-linear element is a micromechanical resonator.

5. A reflector element in accordance with claim 1, wherein the non-linear element is a diode.

6. A reflector element in accordance with claim 1, wherein the reflector element further comprises a directional antenna.

7. A reflector element in accordance with claim 1, wherein said measured quantity is a temperature.

8. A reflector element in accordance with claim 1, wherein the target is integrated in an article of clothing or in a bumper of a vehicle.

9. A reflector element in accordance with claim 1, wherein the sensor is configured to detect an intermodulation frequency reflected signal and/or intermodulation frequency backscatter from the target.

10. A reflector element in accordance with claim 1, wherein the sensor is configured to detect harmonic reflected signal components and/or harmonic components backscatter from the target.

11. A reflector element in accordance with claim 1, wherein the reflector element is located in or on a vehicle.

* * * * *